(12) United States Patent
Rosenberg et al.

(10) Patent No.: US 12,738,265 B2
(45) Date of Patent: Sep. 15, 2026

(54) SELF-TRAINING WITH ORACLE AND TOP-RANKED HYPOTHESES

(71) Applicant: Google LLC, Mountain View, CA (US)

(72) Inventors: Andrew M. Rosenberg, Brooklyn, NY (US); Murali Karthick Baskar, Mountain View, CA (US); Bhuvana Ramabhadran, Mt. Kisco, NY (US)

(73) Assignee: Google LLC, Mountain View, CA (US)

( * ) Notice: Subject to any disclaimer, the term of this patent is extended or adjusted under 35 U.S.C. 154(b) by 228 days.

(21) Appl. No.: 18/590,918

(22) Filed: Feb. 28, 2024

(65) Prior Publication Data

US 2024/0296832 A1 Sep. 5, 2024

Related U.S. Application Data

(60) Provisional application No. 63/487,872, filed on Mar. 1, 2023.

(51) Int. Cl.
*G10L 15/06* (2013.01)
*G10L 15/01* (2013.01)
(Continued)

(52) U.S. Cl.
CPC ............ *G10L 15/063* (2013.01); *G10L 15/01* (2013.01); *G10L 15/16* (2013.01); *G10L 15/197* (2013.01)

(58) Field of Classification Search
CPC ....... G10L 15/063; G10L 15/01; G10L 15/16; G10L 15/197
See application file for complete search history.

(56) References Cited

U.S. PATENT DOCUMENTS 12,488,798 B1 * 12/2025 Eakin ..................... G06N 3/045
2023/0186903 A1 * 6/2023 Cui ....................... G10L 15/063 704/232

OTHER PUBLICATIONS

Ogawa, Atsunori, et al. "Rescoring n-best speech recognition list based on one-on-one hypothesis comparison using encoder-classifier model." 2018 IEEE International Conference on Acoustics, Speech and Signal Processing (ICASSP). IEEE, 2018 (Year: 2018).*

(Continued)

*Primary Examiner* — Bhavesh M Mehta
*Assistant Examiner* — Jangwoen Lee
(74) *Attorney, Agent, or Firm* — Honigman LLP; Brett A. Krueger; Grant Griffith

(57) ABSTRACT

A method includes, for each training sample of a plurality of training samples, processing, using an RNN-T model, a corresponding sequence of acoustic frames to obtain an n-best list of speech recognition hypotheses, and, for each speech recognition hypothesis of the n-best list, determining a corresponding number of word errors relative to a corresponding ground-truth transcription. For a top-ranked hypothesis from the n-best list, the method includes determining a first loss based on the corresponding ground-truth transcription. The method includes identifying, as an oracle hypothesis, the speech recognition hypothesis from the n-best list having the smallest corresponding number of word errors relative to the corresponding ground-truth transcription, and determining a second loss for the oracle hypothesis based on the corresponding ground-truth transcription. The method includes determining a corresponding self-training combined loss based on the first and second losses, and training the model based on the corresponding self-training combined loss.

21 Claims, 6 Drawing Sheets

(51) Int. Cl.
*G10L 15/16* (2006.01)
*G10L 15/197* (2013.01)

(56) References Cited

OTHER PUBLICATIONS

Ogawa Atsunori et al: "Rescoring N-Best Speech Recognition List Based on One-on-One Hypothesis Comparison Using Encoder-Classifier Model", 2018 IEEE International Conference on Acoustics, Speech and Signal Processing (ICASSP), IEEE, Apr. 15, 2018 (Apr. 15, 2018), pp. 6099-6103, XP033403971.

Murali Karthick Baskar et al: "O-1: Self-training with Oracle and 1-best Hypothesis", arxiv.org, Cornell University Library, 201 Olin Library Cornell University Ithaca, NY 14853, Aug. 14, 2023 (Aug. 14, 2023), XP091592971.

Variani Ehsan et al: "Neural Oracle Search on N-BEST Hypotheses", ICASSP 2020—2020 IEEE International Conference on Acoustics, Speech and Signal Processing (ICASSP), IEEE, May 4, 2020 (May 4, 2020), pp. 7824-7828, XP033794396.

International Search Report and Written Opinion issued in related PCT Application No. PCT/US2024/017927, dated Feb. 29, 2024.

* cited by examiner

SELF-TRAINING WITH ORACLE AND TOP-RANKED HYPOTHESES

CROSS REFERENCE TO RELATED APPLICATIONS

This U.S. Patent application claims priority under 35 U.S.C. § 119(e) to U.S. Provisional Patent Application No. 63/487,872, filed on Mar. 1, 2023. The disclosure of this prior application is considered part of the disclosure of this application and is hereby incorporated by reference in its entirety.

TECHNICAL FIELD

This disclosure relates to self-training with oracle and top-ranked hypotheses.

BACKGROUND

Automatic speech recognition (ASR) is the process of transcribing input audio into text. ASR is an increasingly important technology that may be used to enable a user to interact with mobile or other devices using spoken (i.e., speech-based) interactions.

SUMMARY

One aspect of the disclosure provides a computer-implemented method executed on data processing hardware that causes the data processing hardware to perform operations including receiving a plurality of training samples, each training sample of the plurality of training samples including a corresponding sequence of acoustic frames characterizing a corresponding training utterance, and a corresponding ground-truth transcription of the corresponding training utterance. For each particular training sample of the plurality of training samples, the operations also include: processing, using a recurrent neural network-transducer (RNN-T) model, the corresponding sequence of acoustic frames to obtain an n-best list of speech recognition hypotheses for the corresponding training utterance; and, for each speech recognition hypothesis of the n-best list of speech recognition hypotheses for the corresponding training utterance, determining a corresponding number of word errors relative to the corresponding ground-truth transcription. The operations also include, for each particular training sample, and for a top-ranked hypothesis from the n-best list of speech recognition hypotheses, determining a first loss based on the corresponding ground-truth transcription; identifying, as an oracle hypothesis, the speech recognition hypothesis from the n-best list of speech recognition hypotheses having the smallest corresponding number of word errors relative to the corresponding ground-truth transcription; determining a second loss for the oracle hypothesis based on the corresponding ground-truth transcription; and determining a corresponding combined loss based on the first and second losses. The operations additionally include training the RNN-T model based on the corresponding combined losses determined for the plurality of training samples.

Implementations of the disclosure may include one or more of the following optional features. In some implementations, the corresponding combined loss includes a summation of the first loss and the second loss. In some examples, determining the first loss for the top-ranked hypothesis includes: determining a first RNN-T loss for the top-ranked hypothesis, and scaling the first RNN-T loss by the respective number of word errors identified for the top-ranked hypothesis relative to the corresponding ground-truth transcription; and determining the second loss for the oracle hypothesis includes determining a second RNN-T loss for the oracle hypothesis, and scaling the second RNN-T loss by the respective number of word errors identified for the oracle hypothesis relative to the corresponding ground-truth transcription. Here, the corresponding combined loss may include a summation of the first loss, the second loss, and a scaled version of the first RNN-T loss. In some implementations, the first RNN-T loss includes a negative log of a particular probability of the probability distribution corresponding to the top-ranked hypothesis, and the second RNN-T loss includes a negative log of a particular probability of the probability distribution corresponding to the oracle hypothesis.

In some examples, the operations also include determining the corresponding ground-truth transcription for a particular training sample using a teacher model that distills the corresponding ground-truth transcription based on the corresponding sequence of acoustic frames. Here, the corresponding combined loss may include a summation of the first loss, the second loss, and a scaled RNN-T loss for the distilled corresponding ground-truth transcription.

In some implementations, the RNN-T model includes an encoder and a decoder. The encoder configured to generate, at each of a plurality of time steps, a higher-order feature representation for a corresponding acoustic frame in the corresponding sequence of acoustic frames. The decoder configured to generate, at each of the plurality of time steps, based on the higher-order feature representation generated by the encoder at the time step, a probability distribution over possible speech recognition hypotheses. In some examples, the decoder includes a prediction network and a joint network. The prediction network configured to, at each of the plurality of time steps subsequent to an initial time step, receive, as input, a sequence of non-blank symbols output by a final Softmax layer, and generate a hidden representation. The joint network configured to: receive, as input, the hidden representation generated by the prediction network at each time step of the plurality of time steps and the higher-order feature representation generated by the encoder at each time step of the plurality of time steps; and generate, at each time step of the plurality of time steps, the probability distribution over possible speech recognition hypotheses. In some implementations, at each time step of the plurality of time steps: the sequence of previous non-blank symbols received as input at the prediction network includes a sequence of N previous non-blank symbols output by the final Softmax layer; and the prediction network is configured to generate the hidden representation by, for each non-blank symbol of the sequence of N previous non-blank symbols, generating a respective embedding, and generating an average embedding by averaging the respective embeddings, the average embedding including the hidden representation.

Another aspect of the disclosure provides a system including data processing hardware and memory hardware in communication with the data processing hardware. The memory hardware stores instructions that, when executed on the data processing hardware, cause the date processing hardware to perform operations including receiving a plurality of training samples, each training sample of the plurality of training samples including a corresponding sequence of acoustic frames characterizing a corresponding training utterance, and a corresponding ground-truth transcription of the corresponding training utterance. For each particular training sample of the plurality of training samples, the operations include: processing, using a recurrent neural network-transducer (RNN-T) model, the corresponding sequence of acoustic frames to obtain an n-best list of speech recognition hypotheses for the corresponding training utterance; and, for each speech recognition hypothesis of the n-best list of speech recognition hypotheses for the corresponding training utterance, determining a corresponding number of word errors relative to the corresponding ground-truth transcription. The operations also include, for each particular training sample, and for a top-ranked hypothesis from the n-best list of speech recognition hypotheses, determining a first loss based on the corresponding ground-truth transcription; identifying, as an oracle hypothesis, the speech recognition hypothesis from the n-best list of speech recognition hypotheses having the smallest corresponding number of word errors relative to the corresponding ground-truth transcription; determining a second loss for the oracle hypothesis based on the corresponding ground-truth transcription; and determining a corresponding combined loss based on the first and second losses. The operations additionally include training the RNN-T model based on the corresponding combined losses determined for the plurality of training samples.

Implementations of the disclosure may include one or more of the following optional features. In some implementations, the corresponding combined loss includes a summation of the first loss and the second loss. In some examples, determining the first loss for the top-ranked hypothesis includes: determining a first RNN-T loss for the top-ranked hypothesis, and scaling the first RNN-T loss by the respective number of word errors identified for the top-ranked hypothesis relative to the corresponding ground-truth transcription; and determining the second loss for the oracle hypothesis includes determining a second RNN-T loss for the oracle hypothesis, and scaling the second RNN-T loss by the respective number of word errors identified for the oracle hypothesis relative to the corresponding ground-truth transcription. Here, the corresponding combined loss may include a summation of the first loss, the second loss, and a scaled version of the first RNN-T loss. In some implementations, the first RNN-T loss includes a negative log of a particular probability of the probability distribution corresponding to the top-ranked hypothesis, and the second RNN-T loss includes a negative log of a particular probability of the probability distribution corresponding to the oracle hypothesis.

In some examples, the operations also include determining the corresponding ground-truth transcription for a particular training sample using a teacher model that distills the corresponding ground-truth transcription based on the corresponding sequence of acoustic frames. Here, the corresponding combined loss may include a summation of the first loss, the second loss, and a scaled RNN-T loss for the distilled corresponding ground-truth transcription.

In some implementations, the RNN-T model includes an encoder and a decoder. The encoder configured to generate, at each of a plurality of time steps, a higher-order feature representation for a corresponding acoustic frame in the corresponding sequence of acoustic frames. The decoder configured to generate, at each of the plurality of time steps, based on the higher-order feature representation generated by the encoder at the time step, a probability distribution over possible speech recognition hypotheses. In some examples, the decoder includes a prediction network and a joint network. The prediction network configured to, at each of the plurality of time steps subsequent to an initial time step, receive, as input, a sequence of non-blank symbols output by a final Softmax layer, and generate a hidden representation. The joint network configured to: receive, as input, the hidden representation generated by the prediction network at each time step of the plurality of time steps and the higher-order feature representation generated by the encoder at each time step of the plurality of time steps; and generate, at each time step of the plurality of time steps, the probability distribution over possible speech recognition hypotheses. In some implementations, at each time step of the plurality of time steps: the sequence of previous non-blank symbols received as input at the prediction network includes a sequence of N previous non-blank symbols output by the final Softmax layer; and the prediction network is configured to generate the hidden representation by, for each non-blank symbol of the sequence of N previous non-blank symbols, generating a respective embedding, and generating an average embedding by averaging the respective embeddings, the average embedding including the hidden representation.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
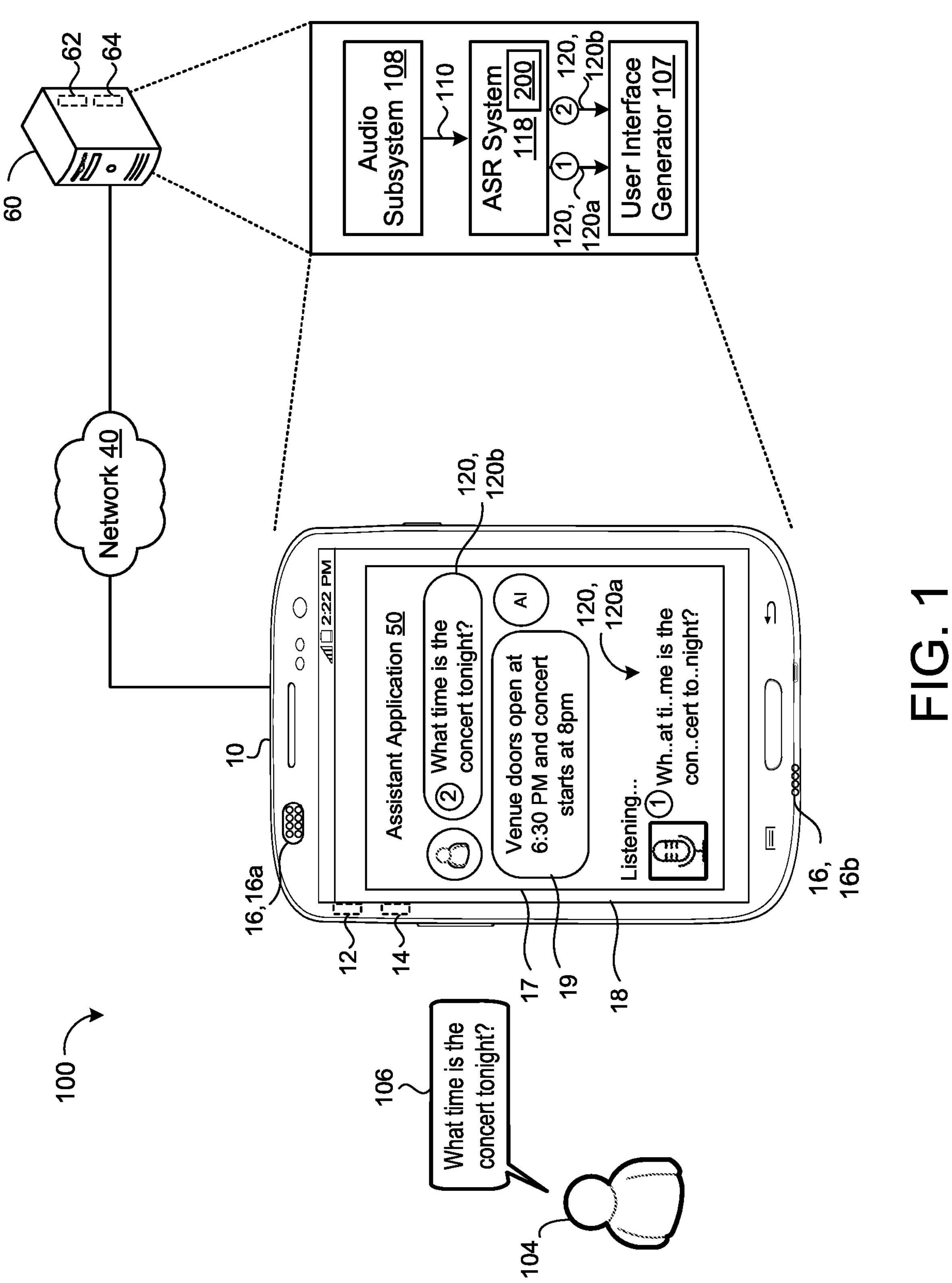
FIG. 1 is a schematic view of an example speech recognition system.

Automatic speech recognition (ASR) is the process of transcribing input audio into text. ASR is an increasingly important technology that may be used to enable a user to interact with mobile or other devices using spoken (i.e., speech-based) interactions. The use of labeled and unlabeled data in training an ASR model has led to a suite of co-training and self-training methods in speech and language processing. The underlying principle of these algorithms is an iterative learning paradigm where a model learns from a ground-truth distribution as well as from its own predictions at the previous iteration with appropriate regularization. However, existing training methods have three drawbacks. First, there may be exposure bias when a model is trained using only supervised training data and does not learn from its own predictions. This may lead to early convergence during training but may result in a mismatch during inference, when no ground-truth is available. Second, there may be mismatches between training objectives and evaluation metrics, such as maximum likelihood estimation (MLE) versus word error rate (WER)), which may cause performance degradation of the model. MLE based training may result in error accumulation during inference, while WER based training may ignore the lattice of predictions which can be utilized to learn from unsupervised data. Third, there may be label bias in E2E systems when the model cannot relearn from new labels and remains biased to past labels.

Prior work on ASR model training has shown that a minimum Bayes risk (MBR) approach may be capable of handling the exposure bias, the training-inference criterion mismatch, and the label bias issues. MBR is a self-training paradigm (commonly referred to as discriminative training) and is either termed as expected MBR (EMBR) when used to reduce expected word errors, or state MBR (sMBR) when minimizing the state level expected errors. Despite the benefits of EMBR, EMBR suffers from two main drawbacks. First, EMBR does not utilize an oracle hypothesis (hypothesis with best WER compared to a ground truth), but instead focusses on expected error reduction by boosting multiple hypotheses scores. Second, the training duration for EMBR is relatively high compared to MLE training as batch size gets scaled by beam size.

Accordingly, there is a need for improved methods for training ASR models. In disclosed implementations, a novel self-training objective, which is a variant of EMBR, discriminatively boosts an oracle hypothesis from an n-best lists of predicted hypotheses. Here, WER versus a ground-truth transcription is used to select the best hypothesis predicted by the model as the oracle hypothesis. The self-training objective allows the efficient use of both supervised and unsupervised training. Here, the self-training objective may be integrated with hard distillation for supervised training. The self-training objective is the first variant of EMBR that can perform unsupervised learning. Moreover, training time and computational costs may be lowered using the self-training objective disclosed herein as compared to EMBR. Furthermore, the self-training objective results in a significant reduction of the gap between the WER for a top-ranked hypothesis and the WER for the oracle hypothesis.

FIG. 1 is an example system 100 that includes one or more users 104 interacting with a user device 10 through voice input. The user device 10 (also referred to generally as a user device 10) is configured to capture sounds (e.g., streaming audio data 110) from the one or more users 104 within the system 100. Here, the streaming audio data 110 may refer to an utterance 106 spoken by the user 104 that functions as an audible query, a command for the user device 10, or an audible communication captured by the user device 10. Speech-enabled systems of the user device 10 may field the query or the command by answering the query and/or causing the command to be performed/fulfilled by one or more downstream applications.

The user device 10 may correspond to any computing device associated with the user 104 and capable of receiving audio data. Some examples of user devices 10 include, but are not limited to, mobile devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions that, when executed by the data processing hardware 12, cause the data processing hardware 12 to perform one or more operations. The user device 10 further includes an audio system 16 with an audio capture device 16*a* (e.g., a microphone) for capturing and converting the utterances 106 into electrical signals and a speech output device 16*b* (e.g., a speaker) for communicating with an audible audio signal (e.g., as output data from the user device 10). The user device 10 may implement an array of audio capture devices 16*a* without departing from the scope of the present disclosure, whereby one or more capture devices 16*a* in the array may not physically reside on the user device 10, but be in communication with the audio system 16.

The system 100 includes an automated speech recognition (ASR) system 118 that implements a joint segmenting and ASR model 200 (also referred to herein as ASR model 200) and resides on the user device 10 of the user 104 and/or on a remote computing system 60 (e.g., one or more remote servers of a distributed system executing in a cloud-computing environment) in communication with the user device 10 via a network 40. The remote computing system 60 may include physical and/or virtual (e.g., cloud based) resources, such as data processing hardware 62 (e.g., remote servers or CPUs) and/or memory hardware 64 (e.g., remote databases or other storage hardware). The memory hardware 64 is in communication with the data processing hardware 62 and stores instructions that, when executed by the data processing hardware 62, cause the data processing hardware 62 to perform one or more operations.

The user device 10 and/or the remote computing system 60 also includes an audio subsystem 108 configured to receive the utterance 106 spoken by the user 104 and captured by the audio capture device 16*a*, and convert the utterance 106 into a corresponding digital format associated with input acoustic frames 110 capable of being processed by the ASR system 118. In the example shown, the user speaks a respective utterance 106 and the audio subsystem 108 converts the utterance 106 into a corresponding sequence of acoustic frames 110 for input to the ASR system 118. Thereafter, the ASR model 200 receives, as input, the sequence of acoustic frames 110 corresponding to the utterance 106, and generates/predicts a corresponding transcription 120 (e.g., speech recognition result/hypothesis) of the utterance 106 as the ASR model 200 receives (e.g., processes) each acoustic frame 110 in the sequence of acoustic frames 110.

In the example shown, the ASR model 200 may perform streaming speech recognition to produce an initial speech recognition result 120, 120*a* and generate a final speech recognition result 120, 120*b* by improving the initial speech recognition result 120*a*. The speech recognition results 120 may either correspond to a partial speech recognition result or an entire speech recognition result. Stated differently, the speech recognition result 120 may either correspond to a portion of an utterance 106 or an entire utterance 106. For example, the partial speech recognition result may correspond to a portion of a spoken utterance or even a portion of a spoken term. However, as will become apparent, the ASR model 200 may perform additional processing on the final speech recognition result 120*b* whereby the final speech recognition result 120*b* may be delayed from the initial speech recognition result 120*a*.

The user device 10 and/or the remote computing system 60 also executes a user interface generator 107 configured to present a representation of the transcription 120 of the utterance 106 to the user 104 of the user device 10. As described in greater detail below, the user interface generator 107 may display the initial speech recognition results 120*a* in a streaming fashion during time 1 and subsequently display the final speech recognition results 120*b* in a streaming fashion during time 2. In some configurations, the transcription 120 output from the ASR system 118 is processed, e.g., by a natural language understanding (NLU) or natural language processing (NLP) module executing on the user device 10 or the remote computing system 60, to execute a user command/query specified by the utterance 106. Additionally or alternatively, a text-to-speech system (not shown) (e.g., executing on any combination of the user device 10 or the remote computing system 60) may convert the transcription 120 into synthesized speech for audible output by the user device 10 and/or another device.

In the example shown, the user 104 interacts with a digital assistant application 50 or other program of the user device 10 that uses the ASR system 118. For instance, FIG. 1 depicts the user 104 communicating with the digital assistant application 50 and the digital assistant application 50 displaying a digital assistant interface 17 on a screen 18 of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16*a* and processed by audio subsystem 108 of the user device 10. In this example, the audio subsystem 108 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition results 120*a*. During time 1, the user interface generator 107 presents, via the digital assistant interface 17, a representation of the initial speech recognition results 120*a* of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 17, a representation of the final speech recognition results 120*b* of the utterance 106 to the user 104 of the user device 10 in a streaming fashion such that words, word pieces, and/or individual characters appear on the screen as soon as they are generated by the ASR model 200. In some implementations, the user interface generator 107 replaces the representation of the initial speech recognition results 120*a* presented at time 1 with the representation of the final speech recognition results 120*b* presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition results 120*a* at an earlier time than the final speech recognition results 120*b*. For instance, as the final speech recognition result 120*b* is presumed to be more accurate than the initial speech recognition result 120*a*, the final speech recognition result 120*b* ultimately displayed as the transcription 120 may fix any terms that may have been misrecognized in the initial speech recognition results 120*a*. In this example, the streaming initial speech recognition results 120*a* output by the ASR model 200 are displayed on the screen of the user device 10 at time 1 are associated with low latency and provide responsiveness to the user 104 that his/her query is being processed, while the final speech recognition result 120*b* output by the ASR model 200 and displayed on the screen at time 2 leverages an additional speech recognition model and/or a language model to improve the speech recognition quality in terms of accuracy, but at increased latency. However, since the initial speech recognition results 120*a* are displayed as the user speaks the utterance 106, the higher latency associated with producing, and ultimately displaying the final speech recognition results 120*b* is not noticeable to the user 104.

The final speech recognition result 120*b* is presumed to be more accurate than the initial speech recognition result 120*a* because the ASR model 200 determines the initial speech recognition results 120*a* in a streaming fashion and the final speech recognition results 120*b* using the prior non-blank symbols from the initial speech recognition result 120*a*. That is, the final speech recognition results 120*b* take into account the prior non-blank symbols and, thus, are presumed more accurate because the initial speech recognition results 120*a* do not take into account any prior non-blank symbols. Moreover, a rescorer (not shown for clarity of illustration) may update the initial speech recognition result 120*a* with the final speech recognition result 120*b* to provide the transcription via the user interface generator 107 to the user 104.

In the example shown in FIG. 1, the digital assistant application 50 may respond to the question posed by the user 104 using NLP or NLU. NLP/NLU generally refer to a process of interpreting written language (e.g., the initial speech recognition result 120*a* and/or the final speech recognition result 120*b*) and determining whether the written language prompts any action. In this example, the digital assistant application 50 uses NLP/NLU to recognize that the question 106 from the user 104 regards the user's schedule and more particularly a concert on the user's schedule. By recognizing these details with NLP/NLU, the automated assistant returns a response 19 to the user's query where the response 19 states, "Venue doors open at 6:30 PM and concert starts at 8 pm." In some configurations, NLP/NLU occurs on the remote computing system 60 in communication with the data processing hardware 12 of the user device 10.

Figure 2:
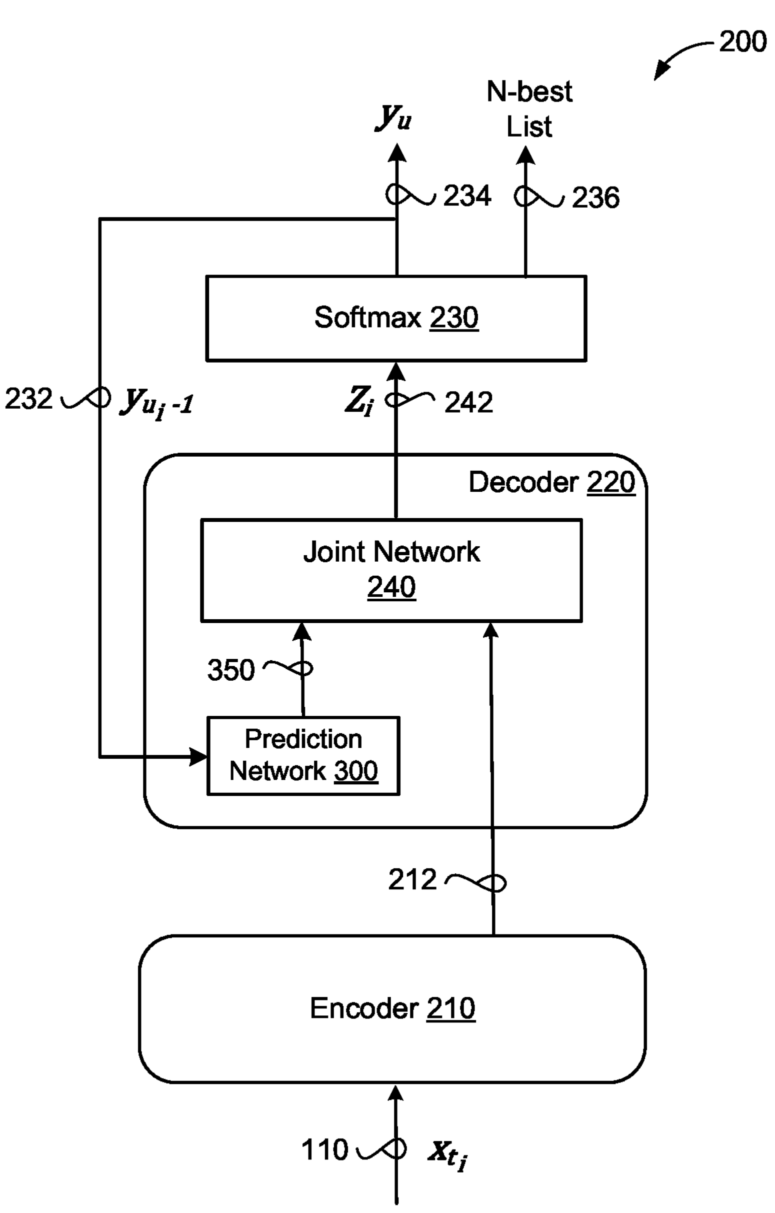
FIG. 2 is a schematic view of an example speech recognition model.

FIG. 2 depicts an example ASR model 200 that includes a Recurrent Neural Network-Transducer (RNN-T) model architecture. The ASR model 200 may also be referred to herein as RNN-T model 200. The use of the RNN-T model architecture is exemplary only, and the ASR model 200 may include other architectures such as transformer-transducer and conformer-transducer model architectures, among others. The RNN-T model architecture provides a small computational footprint and utilizes less memory requirements than conventional ASR architectures, making the RNN-T model architecture suitable for performing speech recognition entirely on the user device 10 (e.g., no communication with a remote computing system or server is required). An example self-training process 400 for training the ASR model 200 is described below in connection with FIG. 4.

As shown, the ASR model 200 includes an encoder 210, a decoder 220, and a final Softmax layer 230 (also referred to herein as Softmax Layer 230). Here, the encoder 210 and the decoder 220 form the architecture of the RNN-T model 200. The encoder 210, which is roughly analogous to an acoustic model (AM) in a traditional ASR system, may include a recurrent network of stacked Long Short-Term Memory (LSTM) layers. Here, the encoder 210 receives a sequence of d-dimensional feature vectors (e.g., acoustic frames 110 (FIG. 1)) $X=(x_1, x_2, \ldots, x_T)$, and generates, at each time step, a higher-order feature representation 212 for a corresponding acoustic frame 110 in the sequence of acoustic frames 110.

In the illustrated example, the decoder 220 includes a prediction network 300 and a joint network 240. The prediction network 300 may include a LSTM network and, like a language model (LM), receives, as input, a respective sequence of non-blank symbols $\{y_{u_i-1}, y_{u_i-2}, \ldots\}$ 232 output by the Softmax layer 230 and generates, at each time step, a dense representation 350. As described in greater detail below, the dense representation 350 may include a single embedding vector. Notably, the sequence of non-blank symbols 232 received at a prediction network 300 captures linguistic dependencies between non-blank symbols 232 predicted during the previous time steps so far to assist the joint network 240 in predicting the probability of a next output symbol $y_u$ or blank symbol during the current time step. As described in greater detail below, to contribute to techniques for reducing the size of the prediction network 300 without sacrificing accuracy/performance of the ASR model 200, a prediction network 300 may receive a limited-history sequence of non-blank symbols 232 $\{y_{u_i-1}, \ldots, y_{u_i-N}\}$ that is limited to the N previous non-blank symbols 232 output by the Softmax layer 230.

The joint network 240 combines a respective higher-order feature representation 212 produced by the encoder 210 and the dense representation 350 (e.g., a single embedding vector 350) produced by the prediction network 300. The joint network 240 predicts a distribution $Z_i=P(y_i|x_{t_i},y_0, \ldots, y_{u_i-1})$ 242 over the next output symbol. Stated differently, the joint network 240 generates, at each time step, a respective probability distribution 242 over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 240 may output a set of values indicative of the likelihood of occurrence of each of a predetermined set of output labels. This set of values can be a vector and indicates a probability distribution over the set of output labels. In some cases, the output labels are graphemes (e.g., individual characters, and potentially punctuation and other symbols), but the set of output labels is not so limited. For example, the set of output labels may include wordpieces and/or entire words, in addition to or instead of graphemes. The output distribution 242 of the joint network 240 may include a posterior probability value for each of the different output labels. Thus, if there are 100 different output labels representing different graphemes or other symbols, the output 242 of the joint network 240 may include 100 different probability values, one for each output label. The probability distribution may then be used to select and assign scores to candidate orthographic elements (e.g., graphemes, wordpieces, and/or words) in a beam search process (e.g., by the Softmax layer 230) for determining the transcription 120.

Notably, the decoder 220 does not make a conditional independence assumption, rather the prediction of each symbol $y_u$ 232 is conditioned not only on the acoustics but also on the sequence of labels $\{y_{u_i-1}, y_{u_i-2}, \ldots\}$ 232 output so far. The decoder 220 assumes an output symbol 232 is independent of future acoustic frames 110, which allows the ASR model 200 to be employed in a streaming fashion.

The Softmax layer 230 receives the probability distribution for a final speech recognition result and selects the speech recognition hypothesis 234 with the highest probability to produce the transcription 120. The Softmax layer 230 may employ any technique to select the speech recognition hypothesis 234 with the highest probability in the distribution 242. In some examples, the Softmax layer 230 selects and assigns scores to candidate orthographic elements (e.g., graphemes, wordpieces, and/or words) in a beam search process (e.g., by the Softmax layer 230) for determining the transcription 120. For instance, the Softmax layer 230 may generate, based the probability distributions 242 for a plurality of output time steps, an n-best list of predicted speech recognition hypotheses 236 for an utterance 106 using a beam search decoding process.

Figure 3:
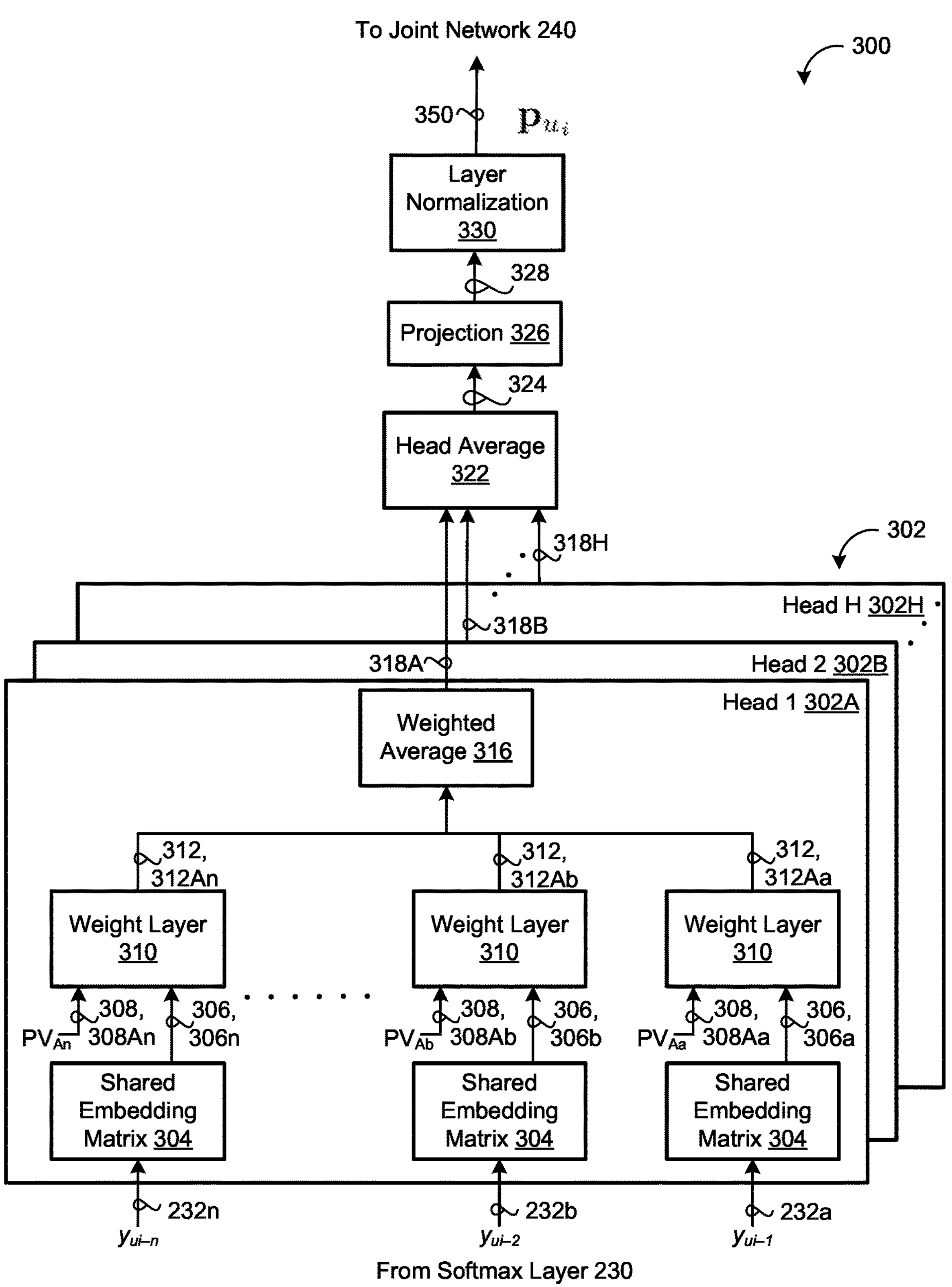
FIG. 3 is a schematic view of an example prediction network.

FIG. 3 is a schematic view of an example prediction network 300 for the ASR model 200. The prediction network 300 receives, as input, a sequence of non-blank symbols $\{y_{u_i-1}, \ldots, y_{u_i-N}\}$ 232*a-n* that is limited to the N previous non-blank symbols 232*a-n* output by the Softmax layer 230. In some examples, N is equal to two. In other examples, N is equal to five. However, N may equal any integer. The sequence of non-blank symbols 232*a-n* indicates an initial speech recognition result 120*a* (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306*a-n* (e.g., $X \in \mathbb{R}^{N \times d_e}$) for each non-blank symbol among the sequence of non-blank symbols $\{y_{u_i-1}, y_{u_i-2}, \ldots\}$ 232*a-n* received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols 232*a-n*. The respective position vector PV 308 assigned to each non-blank symbol indicates a position in the history of the sequence of non-blank symbols (e.g., the N previous non-blank symbols 232*a-n* output by the Softmax layer 230). For instance, the first position vector $PV_{Aa}$ is assigned to a most recent position in the history, while the last position vector $PV_{An}$ is assigned to a last position in the history of the N previous non-blank symbols 232 output by the Softmax layer 230. Notably, each of the embeddings 306 may include a same dimensionality (i.e., dimension size) as each of the position vectors PV 308.

While the corresponding embedding generated by shared embedding matrix 304 for each for each non-blank symbol among the sequence of non-blank symbols $\{y_{u_i-1}, y_{u_i-2}, \ldots\}$ 232*a-n*, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ $\mathbf{308}_{Ba-Bn}$, . . . , and the $H^{th}$ head 302 H defines another different row of position vectors $PV_{Ha-Hn}$ $\mathbf{308}_{Ha-Hn}$.

For each non-blank symbol in the sequence of non-blank symbols $\{y_{u_i-1}, y_{u_i-2}, \ldots\}$ 232*a-n* received, the first head 302A also weights, via a weight layer 310, the corresponding embedding 306 proportional to a similarity between the corresponding embedding and the respective position vector PV 308 assigned thereto. In some examples, the similarity includes a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H*N}\sum_{h,n} X_n * \sum_{e}(X_{n,e} * P_{h,n,e}) \tag{1}$$

In Equation (1), h represents the index of the heads 302, n represents position in context, and e represents the embedding dimension. Additionally, in Equation (1), H, N, and de include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $p_{u_i}$ 350 at the corresponding time step from the plurality of time steps. The prediction network 300 generates only a single embedding vector $p_{u_i}$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $p_{u_i}$ 350.

In some implementations, to further reduce the size of the RNN-T decoder 220, i.e., the prediction network 300 and the joint network 240, parameter tying between the prediction network 300 and the joint network 240 is applied. Specifically, for a vocabulary size |V| and an embedding dimension de, the shared embedding matrix 304 at the prediction network is $E \in \mathbb{R}^{|V| \times d_e}$. Meanwhile, a last hidden layer includes a dimension size $d_h$ at the joint network 240, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the joint network 240 includes a weight matrix $[d_h, |V|]$. By having the prediction network 300 to tie the size of the embedding dimension de to the dimensionality $d_h$ of the last hidden layer of the joint network 240, the feed-forward projection weights of the joint network 240 and the shared embedding matrix 304 of the prediction network 300 can share their weights for all non-blank symbols via a simple transpose transformation. Since the two matrices share all their values, the RNN-T decoder 220 only needs to store the values once on memory, instead of storing two individual matrices. By setting the size of the embedding dimension de equal to the size of the hidden layer dimension $d_h$, the RNN-T decoder reduces a number of parameters equal to the product of the embedding dimension de and the vocabulary size |V|. This weight tying corresponds to a regularization technique.

Figure 4:
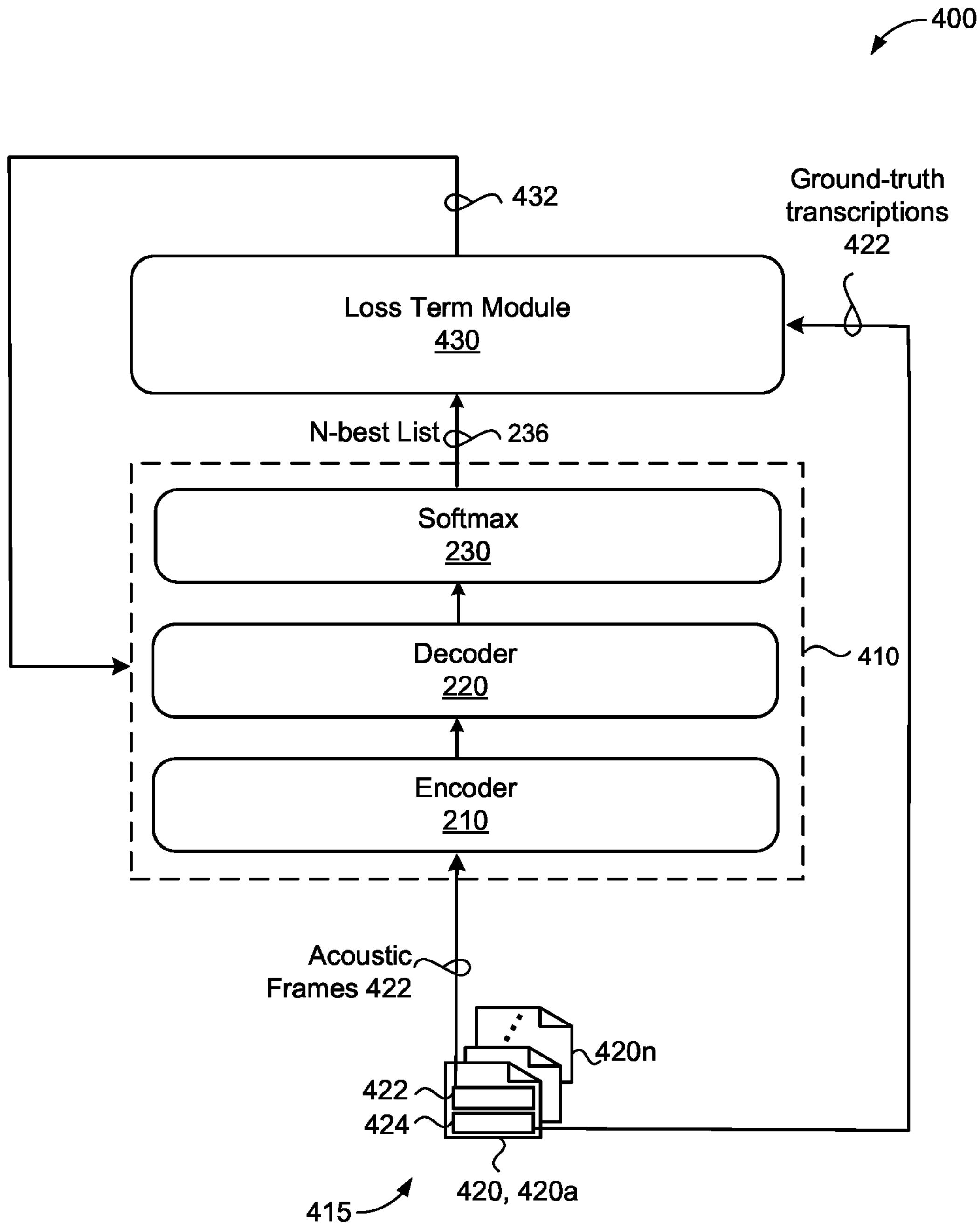
FIG. 4 is a schematic view of an example self-training process with oracle and top-ranked hypotheses.

FIG. 4 is a schematic view of an example self-training process 400 for training an ASR model 410. The self-training process 400 trains the ASR model 410 using a self-training objective based on oracle and top-ranked hypotheses. In this example, the ASR model 410 includes the encoder 210, the decoder 220, and the Softmax layer 230. The self-training process 400 may execute on the remote computing system 60 (i.e., on the data processing hardware 62) or on the user device 10 (i.e., on the data processing hardware 12). In the example shown, the self-training process 400 trains the ASR model 410 using a training data set 415 that includes a plurality of training samples 420. Here, each particular training sample 420 of the plurality of training samples 420 includes a corresponding sequence of acoustic frames 422 characterizing a corresponding training utterance, and a corresponding ground-truth transcription 424 of the corresponding training utterance.

For each particular training sample 420 in the training data set 415, the self-training process 400 processes, using the RNN-T model 410, the corresponding sequence of acoustic frames 422 to obtain a corresponding n-best list of speech recognition hypotheses $Y_{i=1:n}$ 236 output by the Softmax layer 230. Thereafter, for each particular training sample 420, a loss term module 430 receives the corresponding n-best list of speech recognition hypotheses $Y_{i=1:n}$ 236 output by the RNN-T model 410 for the particular training sample 420. For the top-ranked hypothesis $Y_{top\text{-}ranked}$ of the n-best list of speech recognition hypotheses $Y_{i=1:n}$ 236, the loss term module 430 determines a first loss based on the corresponding ground-truth transcription Y* 424. The first loss may be a first RNN-T loss for the top-ranked hypothesis $Y_{top\text{-}ranked}$ based on the corresponding ground-truth transcription Y* 424. Here, the top-ranked hypothesis $Y_{top\text{-}ranked}$ may be selected to be the hypothesis of the corresponding n-best list of speech recognition hypotheses $Y_{i=1:n}$ 236 having highest prediction probability. The loss term module 430 identifies, as an oracle hypothesis $Y_{oracle}$, the speech recognition hypothesis from the n-best list of speech recognition hypotheses $Y_{i=1:n}$ 236 having the smallest corresponding number of word errors relative to the corresponding ground-truth transcription Y* 424, and determines a second loss for the oracle hypothesis $Y_{oracle}$ based on the corresponding ground-truth transcription Y* 424. The second loss may be a second RNN-T loss for the oracle hypothesis $Y_{oracle}$ based on the corresponding ground-truth transcription Y* 424. Notably, the loss term module 430 may discard or ignore all other hypotheses of the corresponding n-best list of speech recognition hypotheses $Y_{i=1:n}$ 236. In some examples, the loss term module 430 does not compute any losses related to any other hypotheses of the corresponding n-best list of speech recognition hypotheses $Y_{i=1:n}$ 236. Here, the RNN-T loss for a hypothesis Y is the negative log of the particular probability of the probability distribution 242 corresponding to the hypothesis Y, which may be expressed as:

$$\mathcal{L}_{rnnt} = -\log p(Y \mid X) \tag{2}$$

The loss term module 430 determines, for each particular training sample 420, a corresponding self-training combined loss $\mathcal{L}_{O1}$ 432 based on a combination of the first and second RNN-T losses. In some examples, the self-training process 400 determines the self-training combined loss $\mathcal{L}_{O1}$ 432 as a summation of the first RNN-T loss for the top-ranked hypothesis $Y_{top\text{-}ranked}$ scaled by its number of word errors score, and the second RNN-T loss for the oracle hypothesis $Y_{oracle}$ scaled by its number of word errors score. The self-training combined loss $\mathcal{L}_{O1}$ 432 may be expressed as:

$$\mathcal{L}_{O1}(X, Y, Y^*) = -\log p(Y_{oracle} \mid X) \cdot (1 - WER(Y_{oracle}, Y^*)) + \log p(Y_{top-ranked} \mid X) \cdot WER(Y_{top\text{-}ranked}, Y^*), \tag{3}$$

where WER(Y,Y*) is the number of word errors between a predicted hypothesis Y and the ground-truth transcription Y*. Notably, when the scaled RNN-T losses are equal (e.g., when $Y_{top\text{-}ranked}=Y_{oracle}$), the self-training combined loss $\mathcal{L}_{O1}$ 432 of Equation (3) equals zero. Accordingly, the combined loss 432 may be alternatively expressed as:

$$\mathcal{L}'_{O1} = L_{O1} + \gamma \mathcal{L}_{rnnt}, \tag{4}$$

where $\mathcal{L}_{rnnt}$ is RNN-T loss of the top-ranked hypothesis $Y_{top\text{-}ranked}$ based on the corresponding ground-truth transcription Y* 424. The self-training combined losses of Equations (3) and (4) boosts the oracle hypothesis $Y_{oracle}$ with the smallest WER score without having to compute all of the error thresholds required for EMBR training. That is, the self-training combined losses of Equations (3) and (4) perform discriminative training between the oracle hypothesis loss and the top-ranked hypothesis loss. Accordingly, the losses of Equations (3) and (4) naturally address the label bias problems of conventional training objectives. That is, when the ASR model 410 is increasing the oracle hypothesis score to the top of the beam search, the top-ranked hypothesis score decreases.

Notably, the self-training training objectives of Equations (3) and (4) are simpler than EMBR training because they do not need to consider all alternative hypotheses, and the computations of expected word errors or risk among all the hypotheses are also eliminated. The self-training training objectives of Equations (3) and (4) also do not require the Softmax computation that EMBR requires.

For unsupervised training, the self-training process 400 includes training the ASR model 410 with target labels Y' 424 obtained from a teacher model, and the loss term module 430 computes the self-training combined loss $\mathcal{L}_{O1,distill}$ 432 using a distillation loss. Here, the self-training combined loss with hard distillation $\mathcal{L}_{O1,distill}$ 432 may be expressed as:

$$\mathcal{L}_{distill} = \mathcal{L}_{rnnt}(X, Y') \tag{5}$$

$$\mathcal{L}_{O1,distill} = \mathcal{L}_{O1}(X, Y, Y') + \lambda \mathcal{L}_{distill} \tag{6}$$

where Y' denotes the pseudo-label generated by the teacher model during training.

Thereafter, the self-training process 400 trains the ASR model 410 based on the self-training combined losses 432 to teach ASR model 410 to reduce the self-training combined losses 432. In some examples, the self-training process 400 trains the ASR model 410 by adjusting, adapting, updating, fine-tuning, etc. one or more parameters or weights of the encoder 210, the decoder 220, or the Softmax layer 230.

Figure 5:
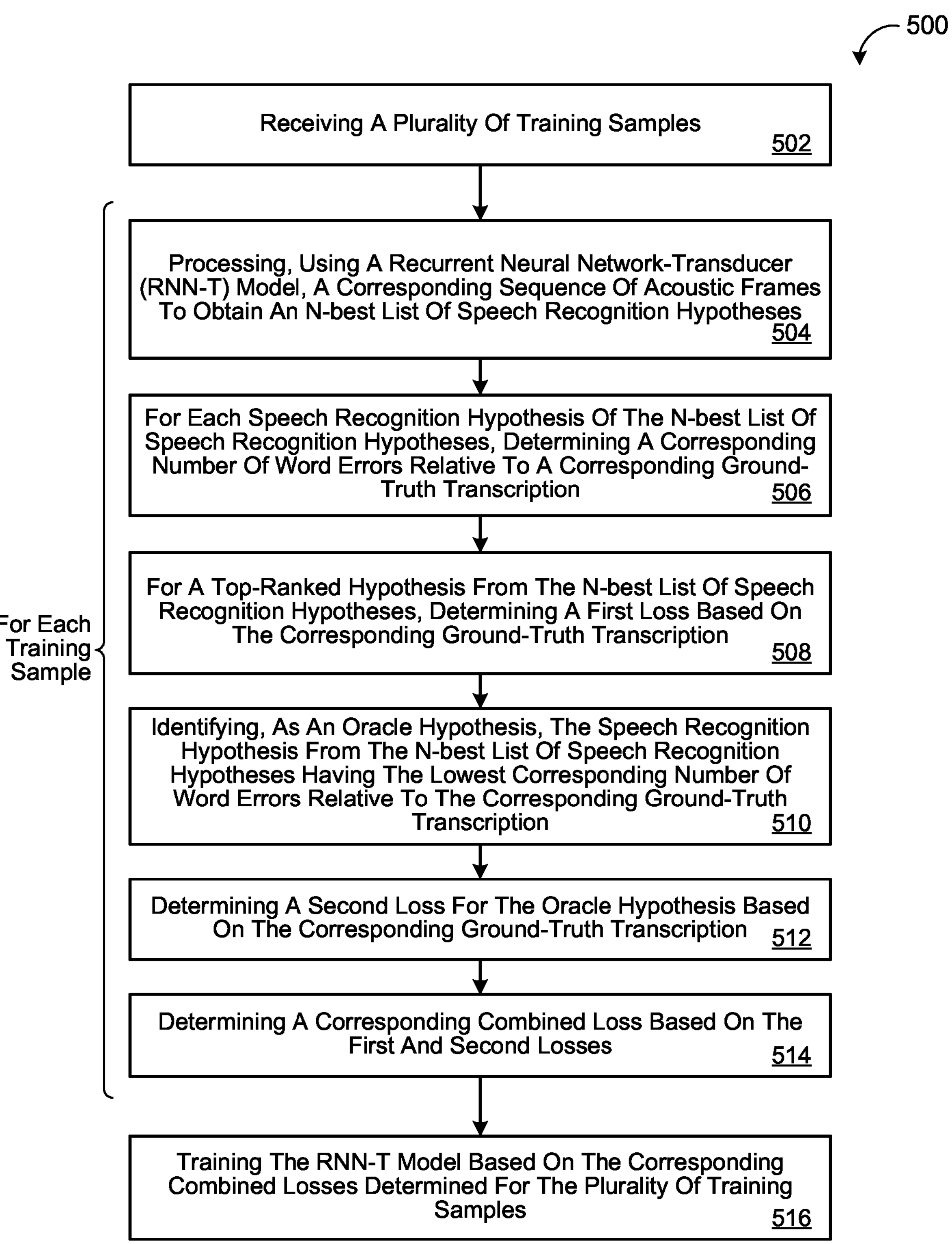
FIG. 5 is a flowchart of an example arrangement of operations for a computer-implemented method for performing self-training with oracle and top-ranked hypotheses.

FIG. 5 is a flowchart of an exemplary arrangement of operations for a computer-implemented method 500 for training a joint segmenting and ASR model (e.g., the ASR model 200). The operations may be performed by data processing hardware 610 (e.g., the data processing hardware 12 of the user device 10 or the data processing hardware 62 of the remote computing system 60) based on executing instructions stored on memory hardware 620 (FIG. 6) (e.g., the memory hardware 14 of the user device 10 or the memory hardware 64 of the remote computing system 60).

At operation 502, the method 500 includes receiving a plurality of training samples 420. Here, each training sample 420 of the plurality of training samples 420 includes a corresponding sequence of acoustic frames 422 characterizing a corresponding training utterance, and a corresponding ground-truth transcription 424 of the training utterance. For each particular training sample 420, the method 500 includes: at operation 504, processing, using a recurrent neural network-transducer (RNN-T) model 200, the corresponding sequence of acoustic frames 422 to obtain an n-best list of predicted speech recognition hypotheses 236 for the corresponding training utterance; and, at operation 506, for each speech recognition hypothesis of the n-best list of predicted speech recognition hypotheses 236 for the corresponding training utterance, determining a corresponding number of word errors relative to the corresponding ground-truth transcription. For each particular training sample 420, the method 500 includes at operation 508, for a top-ranked hypothesis from the n-best list of predicted speech recognition hypotheses 236, determining a first loss based on the corresponding ground-truth transcription 424;

at operation 510, identifying, as an oracle hypothesis, the speech recognition hypothesis from the n-best list of predicted speech recognition hypotheses 236 having the smallest corresponding number of word errors relative to the corresponding ground-truth transcription 424; and at operation 512, determining a second loss for the oracle hypothesis based on the corresponding ground-truth transcription 424. At operation 514, the method 500 includes determining a corresponding self-training combined loss 432 based on the first and second losses. At operation 516, the method 500 includes training the RNN-T model based on the corresponding self-training combined losses 432 determined for the plurality of training samples 420.

Figure 6:
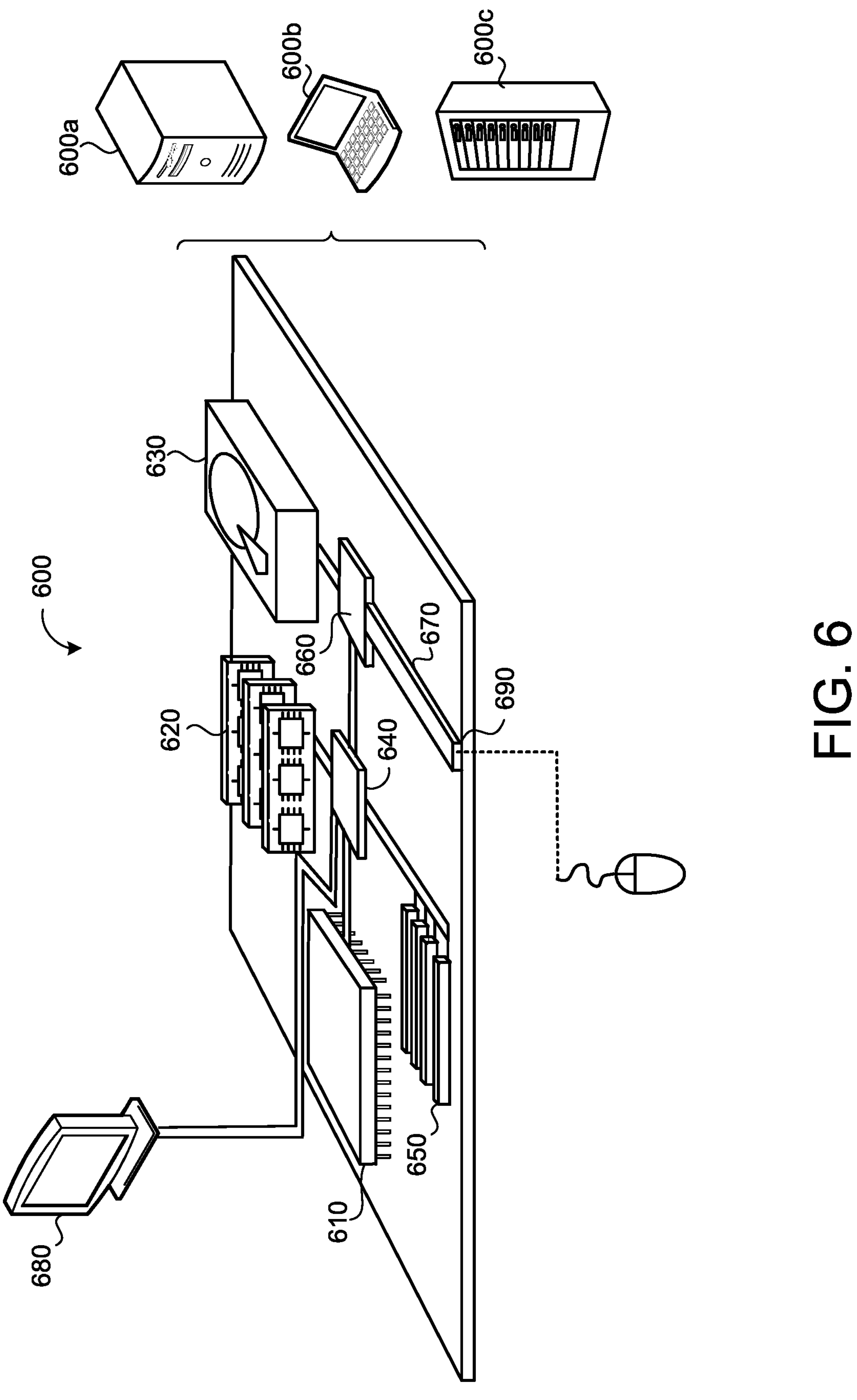
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610 (i.e., data processing hardware) that can be used to implement the data processing hardware 12 and/or 62, memory 620 (i.e., memory hardware) that can be used to implement the memory hardware 14 and/or 64, a storage device 630 (i.e., memory hardware) that can be used to implement the memory hardware 14 and/or 64, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server **600*a* or multiple times in a group of such servers 600*a*, as a laptop computer 600*b*, or as part of a rack server system 600*c***.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, "or" refers to an inclusive or and not to an exclusive or. For example, "A, B, or C" refers to any combination or subset of A, B, C such as: (1) A alone; (2) B alone; (3) C alone; (4) A with B; (5) A with C; (6) B with C; and (7) A with B and with C. Similarly, the phrase "at least one of A or B" is intended to refer to any combination or subset of A and B such as: (1) at least one A; (2) at least one B; and (3) at least one A and at least one B. Moreover, the phrase "at least one of A and B" is intended to refer to any combination or subset of A and B such as: (1) at least one A; (2) at least one B; and (3) at least one A and at least one B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
- receiving a plurality of training samples, each training sample of the plurality of training samples comprising:
  - a corresponding sequence of acoustic frames characterizing a corresponding training utterance; and
  - a corresponding ground-truth transcription of the corresponding training utterance;
- for each particular training sample of the plurality of training samples:
  - processing, using an automatic speech recognition (ASR) model, the corresponding sequence of acoustic frames to obtain an n-best list of speech recognition hypotheses for the corresponding training utterance;
  - for each speech recognition hypothesis of the n-best list of speech recognition hypotheses for the corresponding training utterance, determining a corresponding number of word errors relative to the corresponding ground-truth transcription;
  - for a top-ranked hypothesis from the n-best list of speech recognition hypotheses, determining a first loss based on the corresponding ground-truth transcription;
  - identifying, as an oracle hypothesis, the speech recognition hypothesis from the n-best list of speech recognition hypotheses having the smallest corresponding number of word errors relative to the corresponding ground-truth transcription;
  - determining a second loss for the oracle hypothesis based on the corresponding ground-truth transcription; and
  - determining a corresponding combined loss based on the first and second losses; and
- training the ASR model based on the corresponding combined losses determined for the plurality of training samples.

2. The computer-implemented method of claim 1, wherein the corresponding combined loss comprises a summation of the first loss and the second loss.

3. The computer-implemented method of claim 1, wherein:
- determining the first loss for the top-ranked hypothesis comprises:
  - determining a first ASR loss for the top-ranked hypothesis; and
  - scaling the first ASR loss by the respective number of word errors identified for the top-ranked hypothesis relative to the corresponding ground-truth transcription; and
- determining the second loss for the oracle hypothesis comprises:
  - determining a second ASR loss for the oracle hypothesis; and scaling the second ASR loss by the respective number of word errors identified for the oracle hypothesis relative to the corresponding ground-truth transcription.

4. The computer-implemented method of claim 3, wherein the corresponding combined loss comprises a summation of the first loss, the second loss, and a scaled version of the first ASR loss.

5. The computer-implemented method of claim 3, wherein:

the first ASR loss comprises a negative log of a particular probability of a probability distribution corresponding to the top-ranked hypothesis; and the second ASR loss comprises a negative log of a particular probability of the probability distribution corresponding to the oracle hypothesis.

6. The computer-implemented method of claim 1, wherein the operations further comprise determining the corresponding ground-truth transcription for a particular training sample using a teacher model that distills the corresponding ground-truth transcription based on the corresponding sequence of acoustic frames.

7. The computer-implemented method of claim 6, wherein the corresponding combined loss comprises a summation of the first loss, the second loss, and a scaled ASR loss for the distilled corresponding ground-truth transcription.

8. The computer-implemented method of claim 1, wherein the ASR model comprises:

an encoder configured to generate, at each of a plurality of time steps, a higher-order feature representation for a corresponding acoustic frame in the corresponding sequence of acoustic frames; and a decoder configured to generate, at each of the plurality of time steps, based on the higher-order feature representation generated by the encoder at the time step, a probability distribution over possible speech recognition hypotheses.

9. The computer-implemented method of claim 8, wherein the decoder comprises:

a prediction network configured to, at each of the plurality of time steps subsequent to an initial time step:

receive, as input, a sequence of non-blank symbols output by a final Softmax layer; and generate a hidden representation; and a joint network configured to:

receive, as input, the hidden representation generated by the prediction network at each time step of the plurality of time steps and the higher-order feature representation generated by the encoder at each time step of the plurality of time steps; and generate, at each time step of the plurality of time steps, the probability distribution over possible speech recognition hypotheses.

10. The computer-implemented method of claim 9, wherein, at each time step of the plurality of time steps:

the sequence of previous non-blank symbols received as input at the prediction network comprises a sequence of N previous non-blank symbols output by the final Softmax layer; and the prediction network is configured to generate the hidden representation by:

for each non-blank symbol of the sequence of N previous non-blank symbols, generating a respective embedding; and generating an average embedding by averaging the respective embeddings, the average embedding comprising the hidden representation.

11. A system, comprising:

data processing hardware; and memory hardware in communication with the data processing hardware, the memory hardware storing instructions that, when executed on the data processing hardware, cause the data processing hardware to perform operations comprising:

receiving a plurality of training samples, each training sample of the plurality of training samples comprising:

a corresponding sequence of acoustic frames characterizing a corresponding training utterance; and a corresponding ground-truth transcription of the corresponding training utterance;

for each particular training sample of the plurality of training samples:

processing, using an automatic speech recognition (ASR) model, the corresponding sequence of acoustic frames to obtain an n-best list of speech recognition hypotheses for the corresponding training utterance;

for each speech recognition hypothesis of the n-best list of speech recognition hypotheses for the corresponding training utterance, determining a corresponding number of word errors relative to the corresponding ground-truth transcription;

for a top-ranked hypothesis from the n-best list of speech recognition hypotheses, determining a first loss based on the corresponding ground-truth transcription;

identifying, as an oracle hypothesis, the speech recognition hypothesis from the n-best list of speech recognition hypotheses having the smallest corresponding number of word errors relative to the corresponding ground-truth transcription;

determining a second loss for the oracle hypothesis based on the corresponding ground-truth transcription; and determining a corresponding combined loss based on the first and second losses; and training the ASR model based on the corresponding combined losses determined for the plurality of training samples.

12. The system of claim 11, wherein the corresponding combined loss comprises a summation of the first loss and the second loss.

13. The system of claim 11, wherein:

determining the first loss for the top-ranked hypothesis comprises:

determining a first ASR loss for the top-ranked hypothesis; and scaling the first ASR loss by the respective number of word errors identified for the top-ranked hypothesis relative to the corresponding ground-truth transcription; and determining the second loss for the oracle hypothesis comprises:

determining a second ASR loss for the oracle hypothesis; and scaling the second ASR loss by the respective number of word errors identified for the oracle hypothesis relative to the corresponding ground-truth transcription.

14. The system of claim 13, wherein the corresponding combined loss comprises a summation of the first loss, the second loss, and a scaled version of the first ASR loss.

15. The system of claim 13, wherein:

the first ASR loss comprises a negative log of a particular probability of a probability distribution corresponding to the top-ranked hypothesis; and the second ASR loss comprises a negative log of a particular probability of the probability distribution corresponding to the oracle hypothesis.

16. The system of claim 11, wherein the operations further comprise determining the corresponding ground-truth transcription for a particular training sample using a teacher model that distills the corresponding ground-truth transcription based on the corresponding sequence of acoustic frames.

17. The system of claim 16, wherein the corresponding combined loss comprises a summation of the first loss, the second loss, and a scaled ASR loss for the distilled corresponding ground-truth transcription.

18. The system of claim 11, wherein the ASR model comprises:

an encoder configured to generate, at each of a plurality of time steps, a higher-order feature representation for a corresponding acoustic frame in the corresponding sequence of acoustic frames; and a decoder configured to generate, at each of the plurality of time steps, based on the higher-order feature representation generated by the encoder at the time step, a probability distribution over possible speech recognition hypotheses.

19. The system of claim 18, wherein the decoder comprises:

a prediction network configured to, at each of the plurality of time steps subsequent to an initial time step:

receive, as input, a sequence of non-blank symbols output by a final Softmax layer; and generate a hidden representation; and a joint network configured to:

receive, as input, the hidden representation generated by the prediction network at each time step of the plurality of time steps and the higher-order feature representation generated by the encoder at each time step of the plurality of time steps; and generate, at each time step of the plurality of time steps, the probability distribution over possible speech recognition hypotheses.

20. The system of claim 19, wherein, at each time step of the plurality of time steps:

the sequence of previous non-blank symbols received as input at the prediction network comprises a sequence of N previous non-blank symbols output by the final Softmax layer; and the prediction network is configured to generate the hidden representation by:

for each non-blank symbol of the sequence of N previous non-blank symbols, generating a respective embedding; and generating an average embedding by averaging the respective embeddings, the average embedding comprising the hidden representation.

21. A computer-implemented method executed on data processing hardware that causes the data processing hardware to perform operations comprising:

receiving a plurality of training samples, each training sample of the plurality of training samples comprising:

a corresponding sequence of acoustic frames characterizing a corresponding training utterance; and a corresponding ground-truth transcription of the corresponding training utterance;

for each particular training sample of the plurality of training samples:

processing, using an automatic speech recognition (ASR) model, the corresponding sequence of acoustic frames to obtain an n-best list of speech recognition hypotheses for the corresponding training utterance;

for each speech recognition hypothesis of the n-best list of speech recognition hypotheses for the corresponding training utterance, determining a corresponding number of word errors relative to the corresponding ground-truth transcription;

for a top-ranked hypothesis from the n-best list of speech recognition hypotheses, determining a first loss based on the corresponding ground-truth transcription;

scaling the first loss by the corresponding number of word errors determined for the top-ranked hypothesis;

identifying, as an oracle hypothesis, the speech recognition hypothesis from the n-best list of speech recognition hypotheses having the smallest corresponding number of word errors relative to the corresponding ground-truth transcription;

determining a second loss for the oracle hypothesis based on the corresponding ground-truth transcription;

scaling the second loss by the corresponding number of word errors determined for the oracle hypothesis; and determining a corresponding combined loss based on the scaled first loss and the scaled second loss; and training the ASR model based on the corresponding combined losses determined for the plurality of training samples.

* * * * *